(No Model.)
H. R. ALBRECHT.
GRAIN METER.
No. 363,499. Patented May 24, 1887.
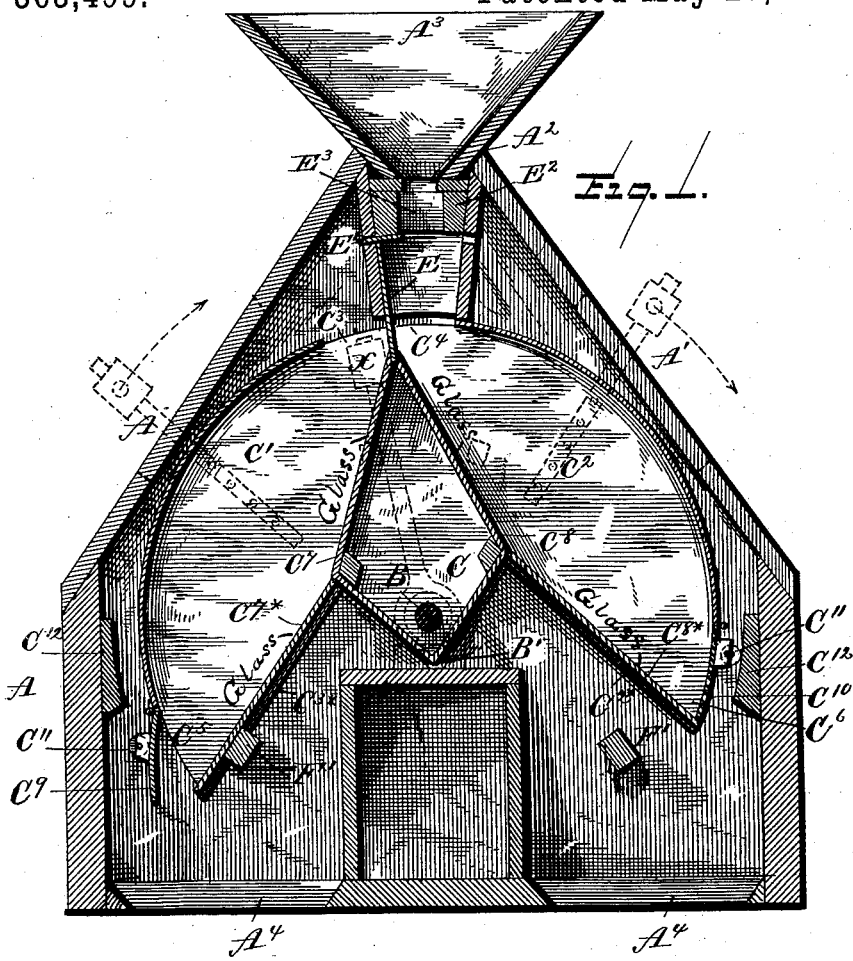
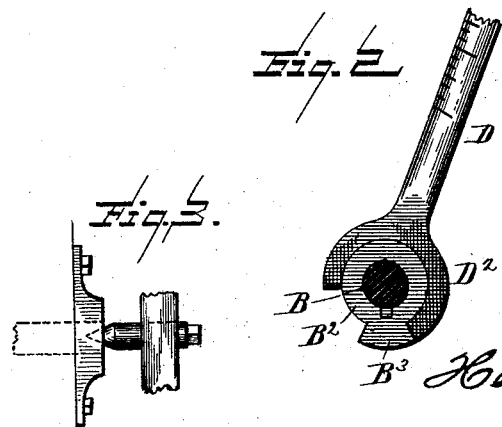
WITNESSES
Henry R. Albrecht,
INVENTOR.
by E. B. Stocking
Attorney.
N. PETERS, Photo-Lithographer, Washington, D. C.

UNITED STATES PATENT OFFICE.

HENRY R. ALBRECHT, OF MOLINE, ILLINOIS.

GRAIN-METER.

SPECIFICATION forming part of Letters Patent No. 363,499, dated May 24, 1887.

Application filed August 28, 1886. Serial No. 212,115. (No model.)

*To all whom it may concern:*

Be it known that I, HENRY R. ALBRECHT, a citizen of the United States, residing at Moline, in the county of Rock Island, State of Illinois, have invented certain new and useful Improvements in Grain-Meters, of which the following is a specification, reference being had therein to the accompanying drawings.

This invention relates to devices for weighing or measuring grain from a grain-reservoir and delivering the same in predetermined quantities into bags or other receptacles for transportation; and the object of the invention is to simplify the construction, reduce the number of parts and cost of the device, and to provide mechanism for positively and automatically and accurately shutting off the supply, so as to get correct weight or measure.

With these objects in view the invention consists in certain features of construction, hereinafter specified, and particularly pointed out in the claims.

Referring to the drawings, Figure 1 is a central vertical section of a grain meter or measurer constructed in accordance with my invention; and Fig. 2 is a detail, hereinafter described. Fig. 3 is a detail of the shaft-bearing.

Like letters indicate like parts in all the figures of the drawings.

A represents the casing, which is rectangular in cross-section, and has slanting sides A′, separated at their upper edges to form an opening, A², in which is mounted a hopper, A³.

Passing longitudinally through the casing and through the grain-receptacle supporting-frame C is a transverse rock-shaft, B, mounted in bearing-blocks B′, or it may be in cone bearings (see Fig. 3) at the ends of the casing. If desired, a simple stub-shaft may be used at one end of the casing. On one end of the rock-shaft B, which is extended outside of and beyond the end of the casing, is a collar, B², which is keyed thereon and provided with a downwardly-depending lug, B³. Upon the collar B² is mounted a suitable scale-beam, D, having graduations marked thereon, and a counterpoise, X, and having its lower end bifurcated, as at D², and adapted to fit the collar B², upon which it is loosely mounted.

On the opposite end of the shaft B may be secured either an indicator or any well-known form of counting mechanism for numbering and recording the amount of grain measured.

Rigidly mounted on the stub-shaft or rock-shaft B is the grain-receptacle C, divided into two compartments, C′ C², each of which converges at the top and bottom, where openings C³ C⁴ and C⁵ C⁶ are formed, said receptacle being exteriorly in the form of an arc of a circle. The compartments are separated by the partitions C⁷ C⁸, which, for the purpose of facilitating the easy passage of grain thereover, are of glass or light steel plates, as indicated in the drawings. The bottoms of the compartments are of glass and inclined at an angle to the partitions C⁷ C⁸, and are supported on suitable flanges, C²ˣ C³ˣ, of the ends of the receptacle, which ends may be of metal or wood.

At the top of the partition formed by the plates C⁸ and C⁷, and extending upwardly therefrom, is a plate, E, running the length of the discharge-spout of the hopper, and at the top of the plate is secured a gate, E′, which works under and against a collar, E², in the discharge-spout, and having an opening, E³, communicating with the hopper.

As thus far described, it will be seen that (taking the device in the position shown in the drawings) grain entering the hopper A³ passes down through the aperture E³ into the receptacle C², through its opening C⁴. The weight or counterpoise X having been set to a proper position upon the scale-beam, and sufficient grain having been let into the receptacle C² to counteract said weight, the grain-receptacle C² will tilt or drop down until it comes into contact with the stops F′, and at the same time the gate E′ will pass under the aperture E³, closing the same for an instant, when the grain will, by the plate E, be directed into the receptacle C′, which has been brought up so that its opening C³ registers with the aperture E³.

The lower ends of the grain-receptacles C′ C² are formed with openings C⁵ C⁶, which are provided with hinged doors C⁹ C¹⁰, mounted upon which are rollers C¹¹. These rollers C¹¹, in connection with blocks C¹², secured opposite them to the sides of the casing, form opening and closing devices for the doors, as it is apparent that when the door moves down with the receptacle (until its rollers pass off of the block C¹²) the weight of the grain will cause the door to open and swing downwardly, and the grain will pass out of the same into bags or other receptacles situated under the casing at the openings A⁴. By this time the opposite grain-receptacle, C', will have received its proper quantity and will fall, carrying with it the rock-shaft B, and causing the roller C¹¹ on the door C¹⁰ to ride upon the block C¹², thus causing said door to close.

A peculiar feature of my invention lies in a sudden jar given the receptacles when they arrive at the point to be emptied, whereby the contents (which, if they be damp or fine grain, such as oats, &c., are liable to pack tightly) are caused to loosen and drop through the opening at the lower end of the receptacle. This jar is caused by the weighted scale-beam D oscillating or falling over to the side which is about to empty, and happens after the doors are opened by reason of the play provided between the lug B³ on the collar and the lower ends of the bifurcations D² of the beam. The weight of the grain carries the receptacle over until it comes against the stop F', and with it carries or turns the rock-shaft and scale-beam, while, when the shaft stops at the instant the reservoir does, said beam still has a fall and sudden stoppage when the end of one of its bifurcations comes into contact with the lug B³, which fall and sudden stop act to loosen the grain and facilitate its removal.

If desired, separate scale-beams (see Fig. 1, dotted lines) may be attached to each of the grain-bins, so that the weight of beams and weights will act with the grain, whereby the apparatus as a whole is rendered more sensitive and accurate in measuring or weighing.

Having described my invention and its operation, what I claim is—

1. In a grain-meter, a longitudinal rock-shaft having at one end a collar provided with a lug and a bifurcated scale-beam mounted on said collar, in combination with grain-receptacles mounted on said shaft, whereby play and a jarring stroke are secured, which tend to loosen grain contained in the receptacles when they arrive at the point for delivering the grain, substantially as specified.

2. In a grain-meter, a transverse rock-shaft having a scale-beam and grain-receptacles mounted thereon, said receptacles being formed with openings at their lower ends, provided with swinging doors having rollers thereon, in combination with blocks mounted in the casing opposite said doors, whereby the oscillation of said shaft and grain-receptacle will cause said doors to open at the time of ejection and close before the time of filling, substantially as specified.

3. The casing A and hopper A³, in combination with the rock-shaft D, collar B², having lug B³, scale-beam D, the grain-receptacle C' C², and the gate E', substantially as specified.

4. The combination of the casing A, provided with the collar E², blocks C¹², stops F', openings A⁴, and hopper A³, with the rock-shaft B, collar B², provided with the lug B³, scale-beam D, the gate E E', and the doors C⁹ C¹⁰ and rollers C¹¹, substantially as specified.

In testimony whereof I affix my signature in presence of two witnesses.

HENRY R. ALBRECHT.

Witnesses:
J. B. CORNWALL,
I. A. MINTEER.